United States Patent
Jiang et al.

(10) Patent No.: US 7,058,172 B2
(45) Date of Patent: Jun. 6, 2006

(54) LONG DISTANCE BIDIRECTIONAL DRIVER

(76) Inventors: Zemin Jiang, Rome 801-401, Qinyuan Xincun, Wuxi City, Jiangsu Province 214000 (CN); Hanmin Jiang, Rome 801-401, Qinyuan Xincun, Wuxi City, Jiangsu Province 214000 (CN)

( * ) Notice: Subject to any disclaimer, the term of this patent is extended or adjusted under 35 U.S.C. 154(b) by 657 days.

(21) Appl. No.: 10/192,925

(22) Filed: Jul. 10, 2002

(65) Prior Publication Data
US 2003/0021349 A1    Jan. 30, 2003

(30) Foreign Application Priority Data
Jul. 10, 2001    (CN) .............................. 01 2 44743

(51) Int. Cl.
*H04M 3/36*    (2006.01)

(52) U.S. Cl. ................. 379/387.01; 379/344; 375/257; 375/211

(58) Field of Classification Search ................ 375/211, 375/214, 220, 257; 370/279, 911; 340/425.1; 333/17.3, 28; 379/341, 342, 344, 387.01, 379/399.01
See application file for complete search history.

(56) References Cited
U.S. PATENT DOCUMENTS
2002/0075962 A1*    6/2002    Davis .......................... 375/257
2002/0106013 A1*    8/2002    Norrell et al. .............. 375/222

* cited by examiner

Primary Examiner—Sinh Tran
Assistant Examiner—Walter F Briney, III
(74) Attorney, Agent, or Firm—Thorpe North & Western, LLP

(57) ABSTRACT

A bidirectional long distance driver for Ethernet, named Ethernet Booster, is disclosed that comprises a forward transmission circuit and a backward transmission circuit, wherein each of the circuits includes Ethernet interface socket RJ45, an impedance matching circuit, power amplifying circuit and frequency compensation circuit. The booster is characterized in that the differential signals received from the Ethernet interface socket RJ45 in the forward/backward transmission circuits are sent to twisted-pair lines through the first impedance matching circuit, power amplifying circuit, the frequency compensation circuit and the second impedance matching circuit in turn. The advantage of the driver is that the booster can greatly enhance the transmission power of 10BASE-T by lengthening network segment distance to 350–500 m, and can decrease the cost greatly by dispensing with in-building switches and making full use of the resources of switches without any or with very few switch ports being wasted. The driver can be used in broadband network applications where long distance driving of 10 base-T Ethernet signals is needed.

3 Claims, 1 Drawing Sheet

LONG DISTANCE BIDIRECTIONAL DRIVER

This application claims benefit of Chinese patent application No. 01244743.9, filed Jul. 10, 2001.

BACKGROUND OF THE INVENTION

The invention relates to an electronic driving device, and specifically to long distance bidirectional driver for Ethernet transmission.

At present, the Ethernet technology is widely used in the field of telecommunication. For example, the Ethernet technology of 10BASE-T, as a mature and reliable technology with twisted-pair lines utilized as a transmission medium, has very rich hardware and software resources, and is capable of reaching a rating rate of 20 Mbps when used in full duplex mode, and 10 Mbps when in half duplex mode, and is capable of fully satisfying the bandwidth requirements of such broadband applications as high speed Internet access, Video-On-Demand, digital video broadcast, video meeting. There is an important limitation in this technology, namely, the length of the network segment is not capable of being longer than 100 meters nominally. According to our test for various Ethernet devices on the markets, such as switches and hubs, the longest working distance of the segments are shorter than 130 meters, which greatly limits the use of Ethernet devices in broadband networks. For a broadband network system used in residential area fibers have to be laid between the center of area and buildings since the distances between the center of area and buildings are often longer than 100 meters, and as a consequence switches are required to be installed in buildings. Such systems are not only expensive, but also are difficult to be maintained and lack of safety.

SUMMARY OF THE INVENTION

The objective of the invention is to provide an Ethernet Booster or bidirectional driver, which can be used at one or two ends of the network segments using catalog 5 twisted-pair and can lengthen the network segment distance of the 10BASE-T to 350 m–500 m.

The objective of the invention is implemented by the following system:

The Ethernet driver comprises a forward transmission circuit and a backward transmission circuit. Each of the circuits includes an impedance matching unit, a power amplifying circuit and a frequency compensation circuit and both transmission circuits are connected to outside lines by using two standard Ethernet interface sockets RJ45. The Ethernet Booster is characterized in that:

In the forward transmission circuit, the differential input signals coming from the first RJ45 are transferred to the first impedance matching circuit, which is composed of T shape resistance network, to prevent or reduce the reflections of signals on the transmission lines. The output of the impedance matching circuit is connected to the input of power amplifying circuit, which is composed of power amplifying IC and some resisters to counteract or pre-counteract the loss of power of signals on transmission lines. The power amplifying circuit is also interconnected with a frequency compensation circuit, which is composed of two inductances that increase the gain for the higher frequency components of the signals in order to keep the balance of the amplitudes of every frequency components. The outputs of the power amplifying circuit and the frequency compensation circuit are connected to the input of the second impedance matching circuit, which is composed of resistance network, and the signals after impedance matched are transferred from the output of the second impedance matching circuit to the second RJ45, and then are sent over a twist-pair line.

The principles are similar in the backward transmission circuit. The difference between them is that the direction of the signal flow is reversed. The signals are entered from the second RJ45 and exit from the first RJ45.

The advantage of the invention is that: (1) Due to signal compensation and power amplifying technology adopted, the Ethernet booster can lengthen the 10BASE-T segment to 350–500 meters by inserting the Ethernet booster at one end of a segment or inserting the boosters at both ends of a segment. (2) When the booster is used to construct the residential area broadband networks of Ethernet, switches can be placed and maintained at the center. By connecting the booster between buildings and the center, network lines can be laid in the way like telephone lines into users' house in buildings. As a result, problems resulting from switches being installed in some publicly accessible places inside buildings, such as power supply of switches, environment temperature and humidity controlling, guarding against theft, and maintenance, can be eliminated. (3) When the booster is used to construct residential area broadband networks of Ethernet, one switch can be connected to many buildings, as a result, the number of in-building switches is reduced largely, the resources of switches are fully used without any or very few ports of switches being wasted, and the cost is reduced dramatically. (4) The invention can be integrated into general switches or network interface cards to form long distance switches or long distance network interface cards.

BRIEF DESCRIPTION OF THE DRAWINGS

The technical solution of the invention is further illustrated according to an embodiment.

DETAILED DESCRIPTION OF THE PREFERRED EMBODIMENTS

Figure 1:
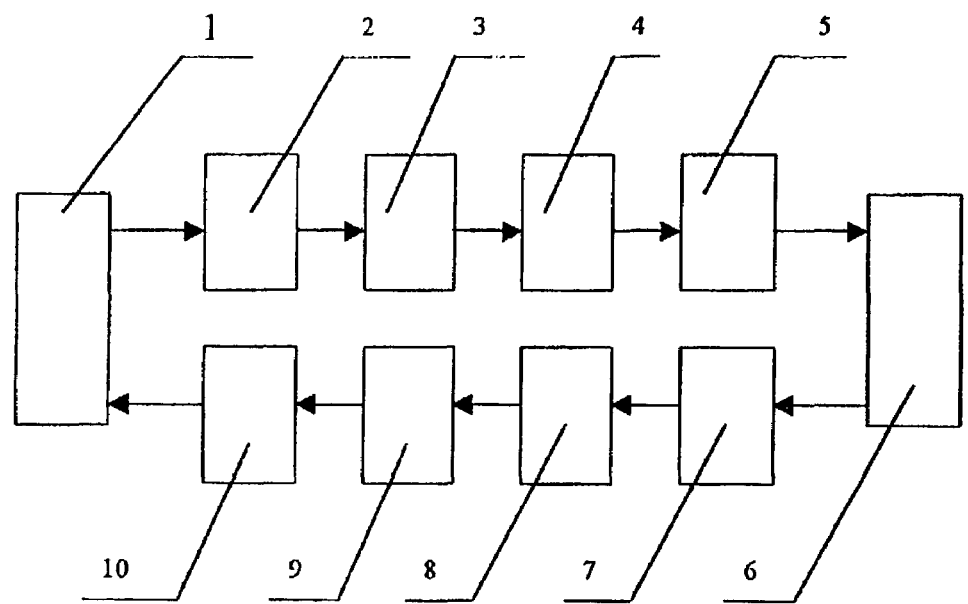
FIG. 1 is the block drawing for the electrical principle of the invention.
Figure 2:
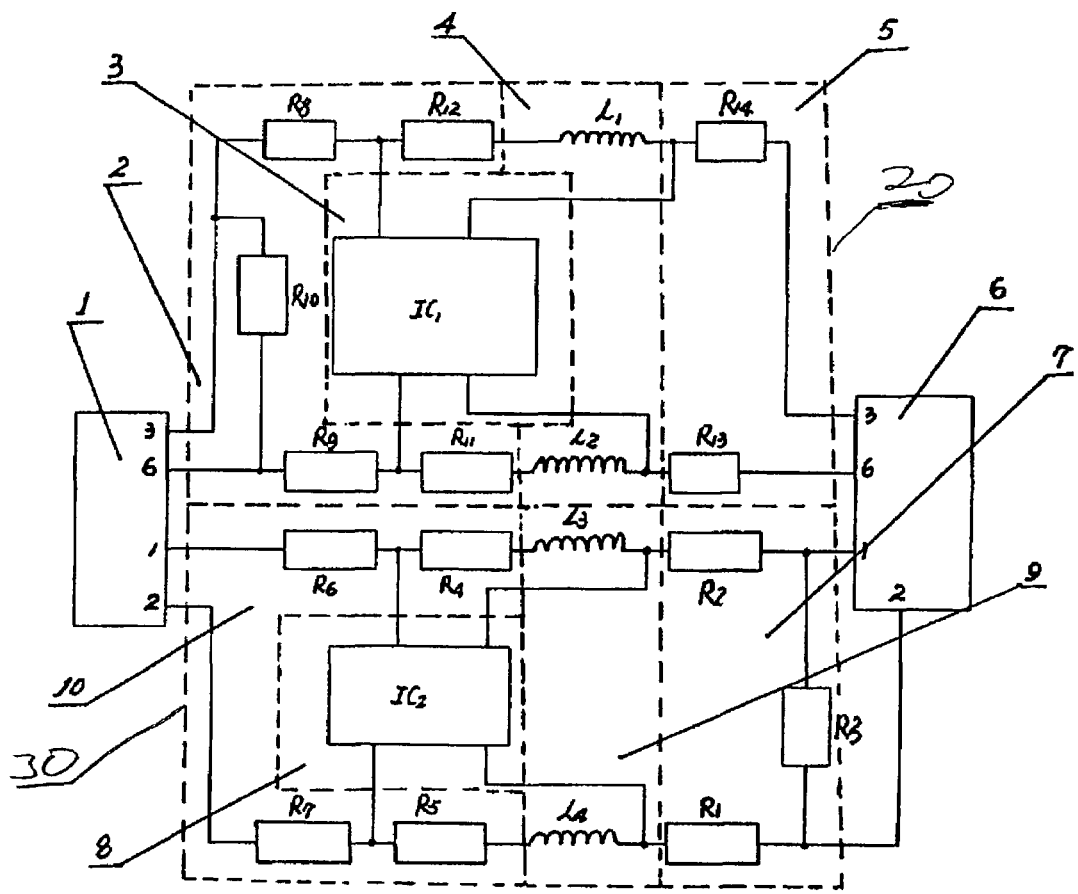
FIG. 2 is the circuit drawing of the invention.

As being shown in FIG. 1 and FIG. 2, the booster of the invention comprises two parts: a forward transmission circuit 20 and a backward transmission circuit 30. The forward transmission circuit 30 is composed of the first Ethernet interface socket RJ45 1, the first impedance matching unit or circuit 2, power amplifying unit or circuit 3, frequency compensation unit or circuit 4, the second impedance matching unit or circuit 5 and the second Ethernet interface socket RJ45 6. In the forward transmission circuit 30, the differential signals received by the first RJ45 1 are output from its No. 3 and 6 pins, and are sent to the input ends of the first impedance matching circuit 2, which is composed of resistance network of T shape that is consisted of resistances R8–R12, to reduce or prevent the reflecting of signals on transmission lines. The output ends of the first impedance matching circuit 2 are connected to the input ends of power amplifying circuit 3, which is composed of an integrated power amplifying unit (such as 8132) to counteract the loss of power of signals on transmission lines. The output ends (OUT) of power amplifying circuit 3 are connected respectively to one ends of two inductances L1 and L2 which compose the frequency compensation circuit 4. The other ends of the inductances L1 and L2 are connected to the resistances R12 and R11 of the resistance network of T type of the first impedance matching circuit 2. The frequency compensation circuit 4 is used to compensate the high frequency components of transmission signals in order to keep the balance of the amplitudes of every frequency components. The output ends of the frequency compensation circuit 4 are connected to the input ends of the second impedance matching circuit 5, which is composed of resistances R13 and R14, and after being impedance matched, the signals are transferred from the output ends of the second impedance matching circuit 5 to No. 3 and 6 pins of the second Ethernet interface socket RJ45 6, and then are sent into twisted-pair through the pins.

The backward transmission circuit 30 with nearly the same circuit structure and working principle as that of the forward transmission circuit 20, is composed of the second Ethernet interface socket RJ45 6, the first impedance matching unit 7, power amplifying unit or circuit 8, frequency compensation unit or circuit 9, the second impedance matching unit or circuit 10, and the first Ethernet interface socket RJ45 1. The differential signal output ends of the second ethernet interface socket RJ45 6 (pins 1 and 2) are connected to the input ends of the first impedance matching circuit 7, which is composed of resistances R1–R3. The output ends of the first impedance matching circuit 7 are connected to the input end (IN) of power amplifying circuit 8 (which is composed of 8132). The output ends (OUT) of power amplifying circuit 8 are connected respectively to resistances R4, R6 and R5, R7 in the second impedance matching circuit 10, which is composed of the resistance network of T type R4–R7. The frequency compensation circuit 9 is composed of two inductances L3 and L4 where L3 is connected to the resistances R2 in the first impedance matching circuit 7 and R4 in the second impedance matching circuit 10, and L4 is connected to the resistances R1 in the first impedance matching circuit 7 and R5 in the second impedance matching circuit 10. The output ends of the second impedance matching circuit 10 are connected to No. 1 and 2 pins of the first Ethernet interface socket RJ45 1, and then the transmitting signals are sent into twisted-pair through the pins.

The working process of the booster according to the invention is as follows: when the booster is connected into Ethernet switch or network interface card, the broadband differential signals transmitted by Ethernet are sent from the pins 3 and 6 of the first Ethernet interface socket RJ45 into the first impedance matching circuit 2 in the forward transmission circuit 20 where impedance matching is done to reduce or prevent the reflecting of signals on transmission lines. Then the signals are sent into power amplifying circuit 3 where its power is amplified to counteract the loss of power. The signals being amplified are sent into the frequency compensation circuit 4 where the high frequency components of transmitted signals are compensated to keep the balance of the amplitudes of every frequency components. After being compensated in frequency, the output signals are matched in the second impedance matching circuit 5 and then sent into the second Ethernet interface socket RJ45 6 where the signals are sent into twisted-pair. When the signals are sent backward, the working process is the same as the process of forward transmission. The differential signals transmitted by Ethernet are sent from the pins 1 and 2 of the second Ethernet interface socket RJ45 6 into the first impedance matching circuit 7, power amplifying circuit 8, frequency compensation circuit 9 and the second impedance matching circuit 10 in order to be processed in turn, and then are sent into twisted-pair by the first Ethernet interface socket RJ45 1.

According to the preferred embodiment of the invention, the parameters of the above respective components are as followings:

R8: 2.2K; R12: 10K; L1: 10 µH; R14: 50Ω;
R10: 100Ω; IC1:8132;
R9: 2.2K; R11: 10K; L2: 10 µH; R13: 50Ω;
R6: 50Ω; R4: 10K; L3: 1 µH; R2: 2.2K;
IC2:8132; R3: 100Ω;
R7: 50Ω; R5: 10K; L4: 1 µH; R1: 2.2K.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the claims.

What is claimed is:

1. A bidirectional lone distance driver for use with differential signals transmitted over a communications wire, comprising:
    a forward transmission circuit that receives a first differential signal from a first signal source, comprising:
        a first communications connector that can couple to the communications wire to receive the first differential signals;
        an impedance matching circuit, coupled to the first communications connector, to attenuate signal reflection within the received differential signal;
        a power amplifying circuit, coupled to the impedance matching circuit, to amplify the differential signal after processed by the impedance matching circuit;
        a frequency compensation circuit, coupled to the power amplifying circuit, to balance frequency amplitudes within the differential signal; and
        a second impedance matching circuit, coupled to the frequency compensation circuit, to match impedance of the differential signal prior to outputting the differential signal on the communications wire to a signal destination; and
    a backward transmission circuit, coupled to the first communications connector to receive a second differential signal to be transmitted to the first signal source, comprising:
        a second communications connector coupled to the first signal source and a second signal source;
        a first backward transmission impedance matching circuit that can couple to the second communications connector to attenuate signal reflection within the second differential signal;
        a power amplifying circuit, coupled to the first backward transmission impedance matching circuit of the backward transmission circuit, to amplify the second differential signal after processing by the second impedance matching circuit;
        a backward transmission frequency compensation circuit, coupled to the power amplifying circuit, to balance frequency amplitudes within the second differential signal; and a second backward transmission impedance matching circuit, coupled to the backward transmission frequency compensation circuit, to match impedance of the second differential signal prior to outputting the second differential signal on the communications wire to the first different signal source, wherein the impedance matching circuit comprises a resistance circuit of T shape and wherein the frequency compensation comprises an inductance circuit coupled to the power amplifier, the second impedance matching circuit, and to the resistance circuit.

2. A bidirectional long distance driver for use with differential signals transmitted over a communications wire, comprising:
  a forward transmission circuit that receives a first differential signal from a first signal source, comprising:
    a first communications connector that can couple to the communications wire to receive the first differential signals;
    an impedance matching circuit, coupled to the first communications connector, to attenuate signal reflection within the received differential signal;
    a power amplifying circuit, coupled to the impedance matching circuit, to amplify the differential signal after processed by the impedance matching circuit;
    a frequency compensation circuit, coupled to the power amplifying circuit, to balance frequency amplitudes within the differential signal; and
    a second impedance matching circuit, coupled to the frequency compensation circuit, to match impedance of the differential signal prior to outputting the differential signal on the communications wire to a signal destination; and
  a backward transmission circuit, coupled to the first communications connector to receive a second differential signal to be transmitted to the first signal source, comprising:
    a second communications connector coupled to the first signal source and a second signal source;
    a first backward transmission impedance matching circuit that can couple to the second communications connector to attenuate signal reflection within the second differential signal;
    a power amplifying circuit, coupled to the first backward transmission impedance matching circuit of the backward transmission circuit, to amplify the second differential signal after processing by the second impedance matching circuit;
    a backward transmission frequency compensation circuit, coupled to the power amplifying circuit, to balance frequency amplitudes within the second differential signal; and
  a second backward transmission impedance matching circuit, coupled to the backward transmission frequency compensation circuit, to match impedance of the second differential signal prior to outputting the second differential signal on the communications wire to the first different signal source wherein the backward transmission frequency compensation circuit includes a resistive-inductor circuit.

3. An Ethernet Booster comprising forward transmission circuit and backward transmission circuit, wherein each of the circuits is composed of ethernet interface socket RJ45 (1), impedance matching unit (2, 5), power amplifying unit (3) and frequency compensation unit (4), characterized by:
  (a) in the forward transmission circuit, the differential signals received by the first ethernet interface socket RJ45 (1) being outputted from its output ends to the input ends of the first impedance matching unit (2), which is composed of resistance network of T type; the output ends of the first impedance matching unit being connected to the input ends of power amplifying unit (3) which is composed of an integration power amplifying unit; the output ends of the power amplifying unit being connected respectively to one ends of two inductances which compose the frequency compensation unit (4), and the other ends of the two inductances being connected to the resistance network of T type of the first impedance matching unit 2; the output ends of the frequency compensation unit being connected to the input ends of the second impedance matching unit (5) which is composed of resistances network; after impedance matched, the signals being sent to the second ethernet interface socket RJ45 (6) where the signals are sent into twisted-pair; and
  (b) in the backward transmission unit, the output ends of differential signals of the second ethernet interface socket RJ45 (6) being connected to the input ends of the first impedance matching unit (7) which is composed of resistance network; the output ends of the first impedance matching unit (7) being connected to the input ends of the power amplifying unit (8); the output ends of the power amplifying unit (8) being connected respectively to the contacts of resistances in the second impedance matching unit (10) which is composed of resistance network of T type; in the frequency compensation unit (9) which is composed of two inductances (L3, L4), one inductance (L3) being connected to two resistances, one (R2) being in the first impedance matching unit (7) and the other one (R4) in the second impedance matching unit (10), the other inductance (L4) being connected to two resistances too, one (R1) in the first impedance matching unit (7) and the other one (R5) in the second impedance matching unit (10); the output ends of the second impedance matching unit (10) being connected to the first ethernet interface socket RJ45 (1) where the transmitted signals are sent into twisted-pair.

* * * * *